United States Patent [19]

Miyazaki

[11] Patent Number: 4,906,318
[45] Date of Patent: Mar. 6, 1990

[54] DEVICE FOR APPLYING AUXILIARY FILM TO SLIDE FASTENER CHAIN

[75] Inventor: Kunio Miyazaki, Uozu, Japan
[73] Assignee: Yoshida Kogyo K. K., Tokyo, Japan
[21] Appl. No.: 227,620
[22] Filed: Aug. 3, 1988
[30] Foreign Application Priority Data Aug. 4, 1987 [JP] Japan .............................. 62-195978

[51] Int. Cl.[4] .................... A41H 37/06; B29C 65/08
[52] U.S. Cl. .................................. 156/352; 29/33.2; 29/766; 29/767; 156/361; 156/378; 156/520; 156/530; 156/580.2
[58] Field of Search ................... 156/73.1, 352, 361, 156/378, 519, 520, 530, 552, 580.1, 580.2; 425/814; 29/33.2, 34 A, 408, 766, 767

[56] References Cited

U.S. PATENT DOCUMENTS

| 3,671,347 | 6/1972 | Yoshieda | 156/160 |
| 4,324,034 | 4/1982 | Berry et al. | 29/410 |
| 4,381,593 | 5/1983 | Yoshieda et al. | 29/408 |
| 4,516,304 | 5/1985 | Yoshida et al. | 29/408 |
| 4,549,348 | 10/1985 | Toishi | 29/767 |
| 4,771,522 | 9/1988 | Osaki | 29/33.2 |

FOREIGN PATENT DOCUMENTS

| 56-52562 | 12/1981 | Japan . |
| 59-33365 | 8/1984 | Japan . |
| 63-40085 | 8/1988 | Japan . |
| 2011529A | 7/1979 | United Kingdom . |
| 2021681A | 12/1979 | United Kingdom . |
| 2082249A | 3/1982 | United Kingdom . |

Primary Examiner—Michael Wityshyn
Attorney, Agent, or Firm—Hill, Van Santen, Steadman & Simpson

[57] ABSTRACT

An auxiliary film is applied or fused to a slide fastener chain having a pair of intermeshing rows of coupling elements with an element-free space defined therein. The slide fastener chain is fed by a chain feeder along a feed path. The device for applying the auxiliary film includes an ultrasonic horn disposed above the feed path, a holder disposed below the feed path and movable toward and away from the ultrasonic horn, a stopper disposed in the holder and movable into the element-free space of the slide fastener chain, an anvil disposed in the holder and movable toward and away from the ultrasonic horn, and a feed roller assembly for supplying an elongate auxiliary film onto the anvil. A sensor roller is mounted on the holder for pressed engagement with the elongate auxiliary film, the sensor roller having a plurality of circumferentially equally spaced controlling elements. A controlling element sensor is disposed near the sensor roller for sensing the controlling elements one at a time and issuing a command signal to keep the chain feeder energized insofar as the controlling element sensor successively senses the controlling elements.

4 Claims, 3 Drawing Sheets

DEVICE FOR APPLYING AUXILIARY FILM TO SLIDE FASTENER CHAIN

BACKGROUND OF THE INVENTION

1. Field of the Invention

The present invention relates to a device for applying an auxiliary film to an elongate continuous slide fastener chain in an area where a separable end stop will be attached during a process of manufacturing a separable slide fastener 2. Description of the Prior Art Separable slide fasteners are successively manufactured from an elongate continuous slide fastener chain by processing the slide fastener chain in successive steps. The slide fastener chain comprises a pair of slide fastener stringers composed of two stringer tapes and a pair of intermeshing rows of coupling elements mounted on respective longitudinal inner edges of the stringer tapes. In one processing step, element-free spaces are defined in the rows of coupling elements at equally spaced intervals. In a subsequent processing step, an auxiliary film of thermoplastic synthetic resin is ultrasonically applied or fused to the stringer tapes across one of the element-free spaces near one end thereof. One known device for applying such an auxiliary film intermittently feeds the slide fastener chain in one horizontal direction. While the slide fastener chain is being fed along, a stopper is inserted into the element-free space to stop the slide fastener chain, and then an elongate auxiliary film is supplied to a position above a movable anvil disposed below the slide fastener chain in vertical alignment with an ultrasonic horn fixedly located over the slide fastener chain. Then, the anvil is moved upwardly to press the slide fastener chain against the ultrasonic horn, cut off the elongate auxiliary film into a predetermined film piece, and then fuse the film piece to the slide fastener chain with ultrasonic energy generated by the ultrasonic horn.

The elongate auxiliary film is supplied from a film roll by a feed roller and a presser roller which grip the film therebetween. The elongate auxiliary film is fed a desired length in each feeding cycle by controlling the rotation of the feed roller. Even if the auxiliary film on the film roll is used up or the auxiliary film fails to be fed for some reasons, the anvil is elevated against the slide fastener chain with no film piece therebetween. When this happens, a slide fastener chain length is fed along with no auxiliary film piece applied thereto.

SUMMARY OF THE INVENTION

In view of the foregoing problems, it is an object of the present invention to provide a device for applying an auxiliary film to a slide fastener chain while detecting an error in the feeding of the auxiliary film and stopping the feeding of the slide fastener chain and the upward movement of an anvil in response to such a detected error, so that any slide fastener chain length with no auxiliary film piece or with an auxiliary film piece shorter than required will not be produced.

According to the present invention, there is provided a device for applying an auxiliary film to a slide fastener chain having a pair of intermeshing rows of coupling elements with an element-free space defined therein, comprising: feed means including a feed path for feeding the slide fastener chain along the feed path; an ultrasonic horn disposed above the feed path; a holder disposed below the feed path and movable toward and away from the ultrasonic horn; a stopper disposed in the holder and movable into the element-free space of the slide fastener chain; an anvil disposed in the holder and movable toward and away from the ultrasonic horn; a feed roller assembly for supplying an elongate auxiliary film onto the anvil; a sensor roller mounted on the holder for pressed engagement with the elongate auxiliary film, the sensor roller having a plurality of circumferentially equally spaced controlling elements; and a controlling element sensor disposed near the sensor roller for sensing the controlling elements one at a time and issuing a command signal to keep the feed means energized insofar as the controlling element sensor successively senses the controlling elements.

Many other advantages and features of the present invention will become manifest to those versed in the art upon making reference to the detailed description and the accompanying sheets of drawings in which a preferred structural embodiment incorporating the principles of the present invention is shown by way of example.

DETAILED DESCRIPTION

Figure 5:
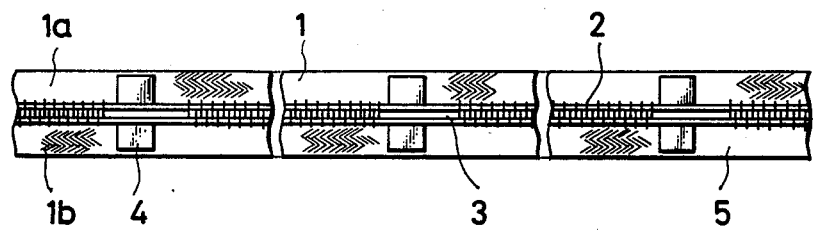
FIG. 5 is a fragmentary plan view of a slide fastener chain with auxiliary film pieces fused thereto.

FIG. 5 shows an elongate continuous slide fastener chain 1 comprising a pair of slide fastener stringers 1a, 1b composed of two stringer tapes 5 and a pair of intermeshing rows of coupling elements 2 mounted on respective longitudinal inner edges of the stringer tapes 5. The slide fastener chain 1 is processed successively in various steps to produce separable slide fasteners. In one step, element-free spaces 3 are defined in the rows of coupling elements 2 at equally spaced intervals. In a subsequent step, auxiliary film pieces 4 of thermoplastic synthetic resin are ultrasonically applied or fused to the stringer tapes 5 across the respective element-free spaces 3 near one end thereof.

Figure 1:
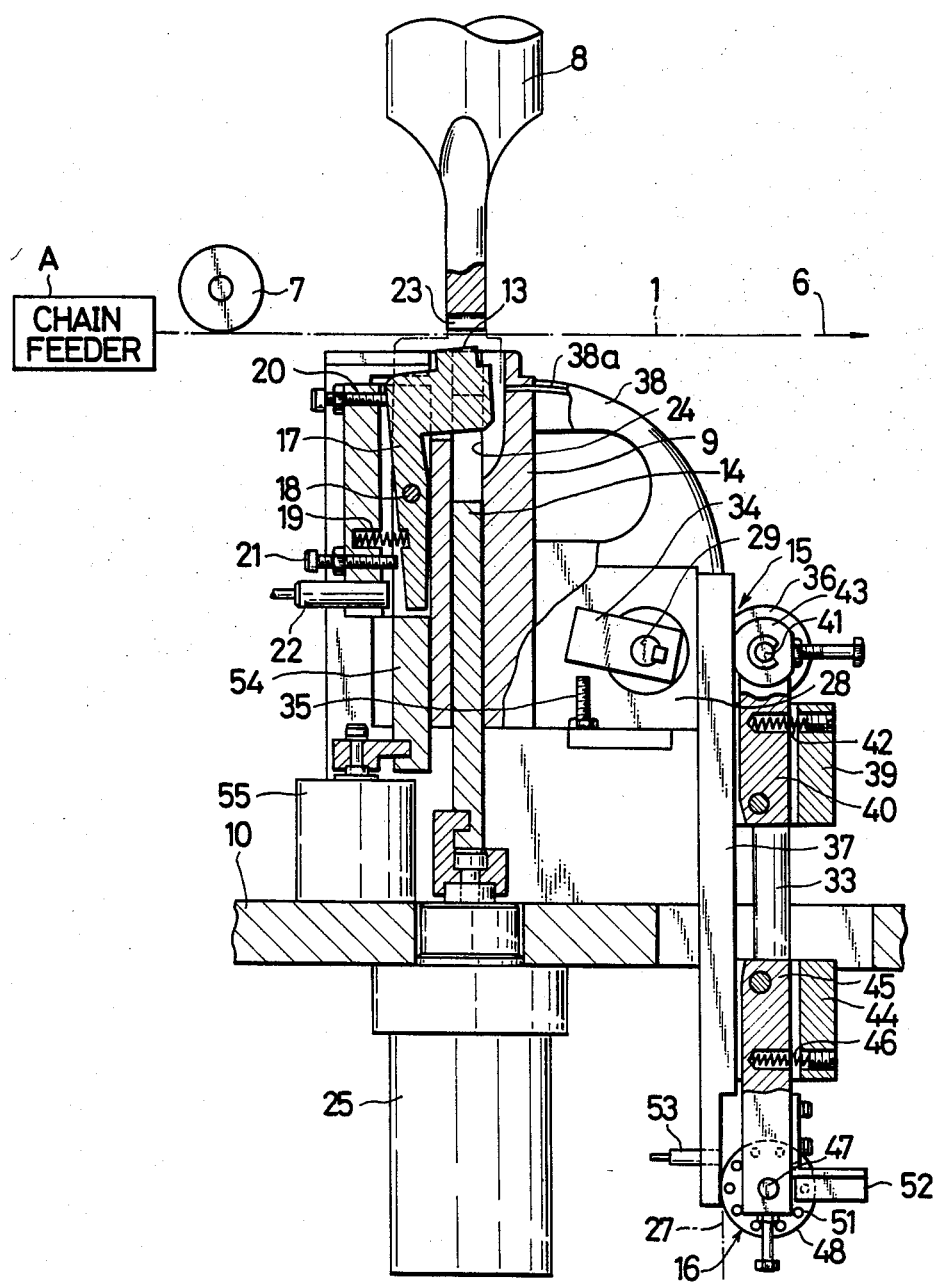
FIG. 1 is a fragmentary front elevational view, partly in cross section, of a device for applying an auxiliary film to a slide fastener chain according to the present invention.

FIG. 1 shows a device for applying such an auxiliary film to the slide fastener chain 1 in accordance with the present invention. The slide fastener chain 1 is fed by a chain feeder A, which may be a feed roller or the like, in the direction of the arrow along a feed path 6 in which there is disposed a space sensor roller 7. When an element-free space 3 in the slide fastener chain 1 is detected by the space sensor roller 7, the speed of travel of the slide fastener chain 1 is reduced. An ultrasonic horn 8 is fixedly disposed above the feed path 6, and a holder 9 is disposed below the feed path 6 in confronting relation to the ultrasonic horn 8.

Figure 2:
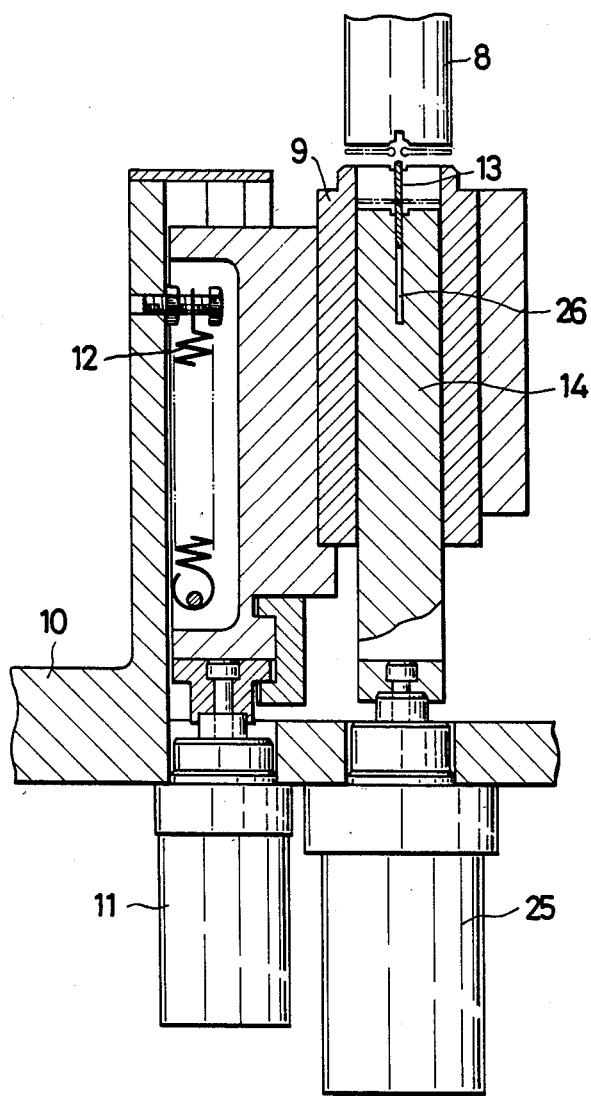
FIG. 2 is a vertical cross-sectional view of an anvil and associated components in the device.

The holder 9 is vertically slidably mounted on a frame 10. As shown in FIG. 2, the holder 9 is vertically movable by a first cylinder 11 mounted on the frame 10 and is normally urged to move upwardly by a tension spring 12. The holder 9 supports therein a stopper 13 movable vertically into the element-free space 3 in the slide fastener chain 1, and an anvil 14 positioned in vertical alignment with the ultrasonic horn 8. As shown in FIG. 1, the device also includes an auxiliary film supply assembly 15 and an auxiliary film supply sensor 16.

More specifically, as shown in FIG. 1, the stopper 13 is disposed on the upper end of a stop lever 17 vertically disposed in a slide block 54 which in turn is disposed in the holder 9 and swingable in directions along the feed path 6 about a pivot shaft 18. The stop lever 17 is normally biased to turn counterclockwise about the pivot shaft 18 by a spring 19 located below the pivot shaft 18 for urging the stopper 13 upwardly. The angular movement of the stop lever 17 is limited by a pair of vertically spaced adjustment bolts 20, 21 mounted on the slide block 54. A space sensor 22 mounted on the slide block 54 comprises a proximity switch positioned in confronting relation to the lower end of the stop lever 17. While slide fastener chain 1 is being fed along the feed path 6, the space sensor roller 7 detects the element-free space 3 whereupon a second cylinder 55 is operated to move the slide block 54 and hence the stopper 13 upwardly until the upper surface portion of the stopper 13 enters the space 3. Continued feed of the slide fastener chain 1 causes the leading end of intermeshing rows of coupling elements 2 just upstream of the space 3 to engage and displace the stopper 13 forwardly, whereupon the stop lever 17 is angularly moved into an upright position, which is sensed by the space sensor 22. The space sensor 22 then issues a signal to the chain feeder to inactivate the same for thereby stopping the feeding of the slide fastener chain 1. At the same time, the first cylinder 11 is actuated to elevate the holder 9. When the stopper 13 is moved upwardly by the upward movement of the slide block 54, the upper portion of the stopper 13 enters a slot 23 defined in the lower end of the ultrasonic horn 8. The slot 23 divides the lower end of the ultrasonic horn 8 into two laterally spaced end portions positioned respectively on the stringer tapes 5.

As illustrated in FIGS. 1 and 2, the anvil 14 is slidably fitted in a vertical hole 24 defined in the holder 9 and is vertically movable by a third cylinder 25 mounted on the frame 10. The anvil 14 is vertically slidably disposed in the vertical hole 24. The anvil 14 has a slot 26 defined in the upper end thereof and dividing the upper end of the anvil 14 into two laterally spaced end portions, the stopper 13 being accommodated in the slot 26.

Figure 3:
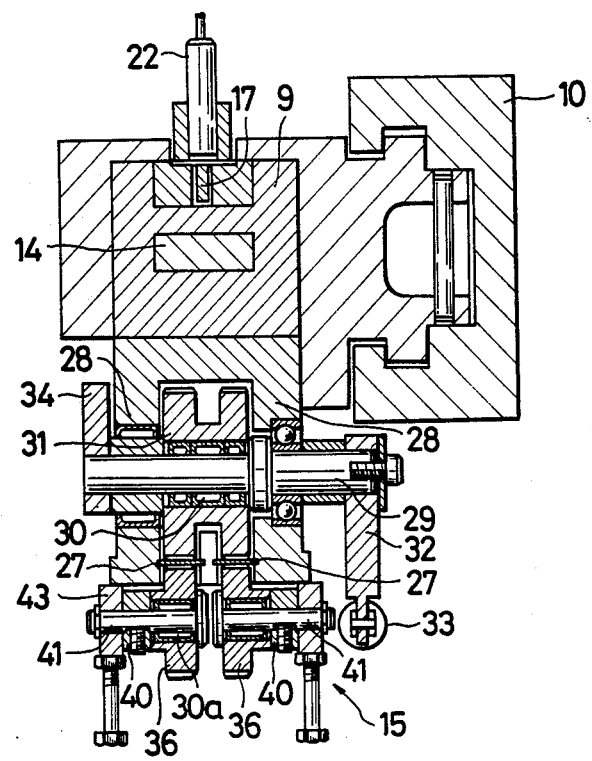
FIG. 3 is a horizontal cross-sectional view of a film supply assembly.

As illustrated in FIGS. 1 and 3, the auxiliary film supply assembly 15 serves to supply two elongate auxiliary films 27 and has a pair of brackets 28 mounted on the holder 9 remote from the stopper 13 and supporting a rotatable shaft 29. A feed roller 31 having a pair of laterally spaced rolls with grooves defined in their outer peripheral surfaces is rotatably supported on the shaft 29 with a one-way clutch 30 interposed therebetween. An actuating lever 32 is fixed to one end of the rotatable shaft 29. The actuating lever 32 is coupled at one end to a fourth cylinder 33. When the fourth cylinder 33 is actuated to move the actuating lever 32 upwardly, the shaft 29 is rotated about its own axis in one direction to rotate the feed roller 31. When the actuating lever 32 is moved downwardly by the fourth cylinder 33, the shaft 29 is rotated about its own axis in the opposite direction, but the feed roller 31 remains stopped because of the one-way clutch 30. A limiting arm 34 is secured to the other end of the rotatable shaft 29. A stopper pin 35 in the form of a vertical bolt is attached to one of the brackets 28 for engaging the limiting arm 34 to accurately limit the angular displacement of the feed roller 31. A pair of presser rollers 36 is disposed in confronting relation to the feed roller 31 for gripping the elongate auxiliary films 27 therebetween to supply them. Downwardly extending elongate guides 37 are mounted on the respective distal ends of the brackets 28 for guiding the elongate auxiliary films 27 respectively therealong. Another guide 38 is mounted on the brackets 28 and has a pair of arcuate guide grooves 38a defined therein extending from the upper ends of the guides 37 and communicating with an upper portion of the vertical hole 24 defined in the holder 9 for guiding the elongate auxiliary films 27 from the guides 37 along the guide grooves 38a into the hole 24.

A pair of first support levers 40 is pivotally supported at its lower end on a first support 39 mounted laterally on upper portions of the guides 37, the first support levers 40 supporting respective fixed shafts 41. The presser rollers 36 are rotatably mounted on the fixed shafts 41 through respective one-way clutches 30a. The first support levers 40 are normally urged toward the feed roller 31 under the resiliency of springs 42. A pair of cams 43 held against the guides 37 is mounted on the fixed shaft 41. By turning the cams 43 on the fixed shaft 41, the presser rollers 36 can be selectively pressed against and spaced from the feed roller 31.

Figure 4:
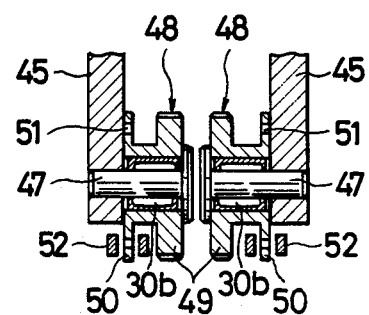
FIG. 4 is a sectional view of a film sensor.

The auxiliary film supply sensor 16 is constructed as follows: As illustrated in FIGS. 1 and 4, a second support 44 is mounted on lower portions of the guides 37, and a pair of second support levers 45 is pivotally supported at its upper portion on the second support 44. The second support levers 45 are normally urged toward the guides 37 by respective springs 46. A pair of sensor rollers 48 is rotatably supported on respective support shafts 47 mounted on lower portions of the second support levers 45 through respective one-way clutches 30b for being pressed against the elongate auxiliary films 27 as they are fed along the guides 37. The sensor rollers 48 have respective driven rolls 49 and respective discs 50 coaxially coupled to and axially spaced from the driven rolls 49, each disc 50 having a plurality of controlling elements 51 equally spaced circumferentially. Each of the controlling elements 51 may be a through hole (as shown) or a projection. A controlling element sensor 52 comprising a photoelectric switch or a proximity switch is installed on each of the second support levers 45 for detecting the controlling elements. Upon rotation of each of the sensor rollers 48 driven by one of the elongate auxiliary films 27 as they are fed, the corresponding controlling element sensor 52 detects a next controlling element 51 to detect that the elongate auxiliary film 27 has been fed a predetermined length, and issues command signals to actuate the first and third cylinders 11, 25. If no controlling element is detected by the sensor 52 upon rotation of the sensor rollers 48, then this means that no sufficient length of the auxiliary film 27 is fed along, and the controlling element sensor 52 issues a command signal to the chain feeder A to stop the feeding of the slide fastener chain 1 along the feed path 6. A pair of abnormality sensors 53 is mounted on lower end portions of the guides 37, respectively, for detecting joint seams of the elongate auxiliary films 27.

The device of the aforesaid arrangement will be operated as follows: While the slide fastener chain 1 is being fed until a next element-free space 3 is detected, the elongate auxiliary films 27 are supplied a predetermined length onto the anvil 14 in the vertical hole 24 by actuating the fourth cylinder 33 to rotate the feed roller 31, the length of the films 27 which is to be supplied being determined by the limiting arm 34 and the stopper pin 35. Under normal condition, the sensor rollers 48 are rotated by the auxiliary films 27 being supplied, and the controlling element sensors 52 detect next controlling elements 51 to control the operation of the device. If no controlling element 51 is detected by the sensors 52 although the feed roller 31 is normally rotated, the feeding of the slide fastener chain 1 is stopped, and no subsequent operation command is given.

When the controlling element sensors 52 issue command signals as a result of normal feeding of the elongate auxiliary films 27, the slide fastener chain 1 is continuously fed. After an element-free space 3 is detected by the space sensor roller 7, the speed of travel of the slide fastener chain 1 is lowered. The stopper 13 projects into the element-free space 3 and engages the leading end of the coupling elements 2 just upstream of the space 3. Further travel of the slide fastener chain 1 turns the stop lever 17 into the upright position, which is detected by the space sensor 22 to stop the supply of the slide fastener chain 1 and also to actuate the first cylinder 11 to lift the holder 9 until the slide fastener chain 1 is gripped between the upper surface of the holder 9 and the lower surface of the ultrasonic horn 8. Then, the second cylinder 25 is actuated to elevate the anvil 14 to cut off the elongate auxiliary films 27 into auxiliary film pieces 4 and press the auxiliary film pieces 4 against the lower surfaces of the stringer tapes 5 across the element-free space 3. Thereafter, the ultrasonic horn 8 is energized to apply or fuse the auxiliary film pieces 4 to the stringer tapes 5.

Obviously, various modifications and variations of the present invention are possible in the light of the above teaching. It is therefore to be understood that within the scope of the appended claims the invention may be practiced otherwise than as specifically described.

What is claimed is:

1. A device for applying an auxiliary film to a slide fastener chain having a pair of intermeshing rows of coupling elements with an element-free space defined therein, comprising:
   feed means including a feed path for feeding the slide fastener chain along said feed path;
   an ultrasonic horn disposed above said feed path;
   a holder disposed below said feed path and movable toward and away from said ultrasonic horn;
   a stopper disposed in said holder and movable into the element-free space of said slide fastener chain;
   an anvil disposed in said holder and movable toward and away from said ultrasonic horn;
   a feed roller assembly for supplying an elongate auxiliary film onto said anvil;
   a sensor roller mounted on said holder for pressed engagement with the elongate auxiliary film, said sensor roller having a plurality of circumferentially equally spaced controlling elements; and
   a controlling element sensor disposed near said sensor roller for sensing said controlling elements one at a time and issuing a command signal to keep said feed means energized insofar as said controlling element sensor successively senses said controlling elements.

2. A device according to claim 1, further including a guide mounted on said holder for guiding said elongate auxiliary film, said sensor roller being disposed on said guide upstream of said feed roller assembly in a direction in which said elongate auxiliary film is supplied by said feed roller assembly.

3. A device according to claim 1, said sensor roller comprising a roll rotatably supported on said holder for being rotated by engagement with said elongate auxiliary film and a disc coaxially coupled to and axially spaced from said roll, said disc having said controlling elements.

4. A device according to claim 3, said controlling element sensor being supported on said guide near said disc.

* * * * *